United States Patent [19]

Self

[11] Patent Number: 4,907,925

[45] Date of Patent: Mar. 13, 1990

[54] RIVET PIN

[76] Inventor: Fred Self, 933 Parkside Dr., Richmond, Calif. 94803

[21] Appl. No.: 225,534

[22] Filed: Jul. 28, 1988

Related U.S. Application Data

[63] Continuation of Ser. No. 887,359, Jul. 21, 1986, abandoned.

[51] Int. Cl.$^4$ .................. F16B 21/00; F16B 21/18
[52] U.S. Cl. .................. 411/339; 411/517; 403/371
[58] Field of Search ............ 411/43, 70, 338, 339, 411/501, 508–510, 512, 907, 352, 353, 516, 517; 403/154, 368, 371, 372, 374; 174/151, 153 G

[56] References Cited

U.S. PATENT DOCUMENTS

| 449,721 | 4/1891 | Wheeler | 403/371 |
| 636,641 | 11/1899 | Davin | 403/368 |
| 877,061 | 1/1908 | Earnest | 411/338 |
| 1,993,170 | 3/1935 | Havener | 411/338 |
| 2,009,318 | 7/1935 | Highfield | 403/371 |
| 2,065,333 | 12/1936 | Kirley | 411/339 |
| 2,154,012 | 4/1939 | Rhodes | 411/339 |
| 2,294,398 | 9/1942 | Ferguson | 403/371 |
| 2,489,870 | 11/1949 | Dzus | 411/339 |
| 2,614,729 | 10/1952 | Jung | 411/339 |
| 2,700,172 | 1/1955 | Rohe | 411/338 |
| 2,717,792 | 9/1955 | Pelley | 174/153 G |
| 2,759,082 | 8/1956 | Rea | 411/43 |
| 2,800,526 | 7/1957 | Moorhead | 411/907 |
| 3,238,835 | 3/1966 | Rosenberg | 411/338 |
| 3,251,260 | 5/1966 | Serdechny | 411/338 |
| 3,693,247 | 9/1972 | Brown | 411/339 |
| 3,702,087 | 11/1972 | Schmizt | 411/339 |

FOREIGN PATENT DOCUMENTS 1309117 10/1962 France .................. 411/338

Primary Examiner—Neill R. Wilson
Attorney, Agent, or Firm—Bielen, Peterson & Lampe

[57] ABSTRACT

A rivet for holding together first and second members utilizing a shaft having first and second end portions. The first and second end portions of the shaft at least partially occupy the openings through the first and second members respectively. A cap having an internal bore grips the first end of the shaft which is extended through the first member. The cap has an enlargement including an exterior surface for frictionally engaging the opening through the first member. The shaft also includes an enlargement on the second end portion which is capable of frictionally engaging the second member.

4 Claims, 2 Drawing Sheets

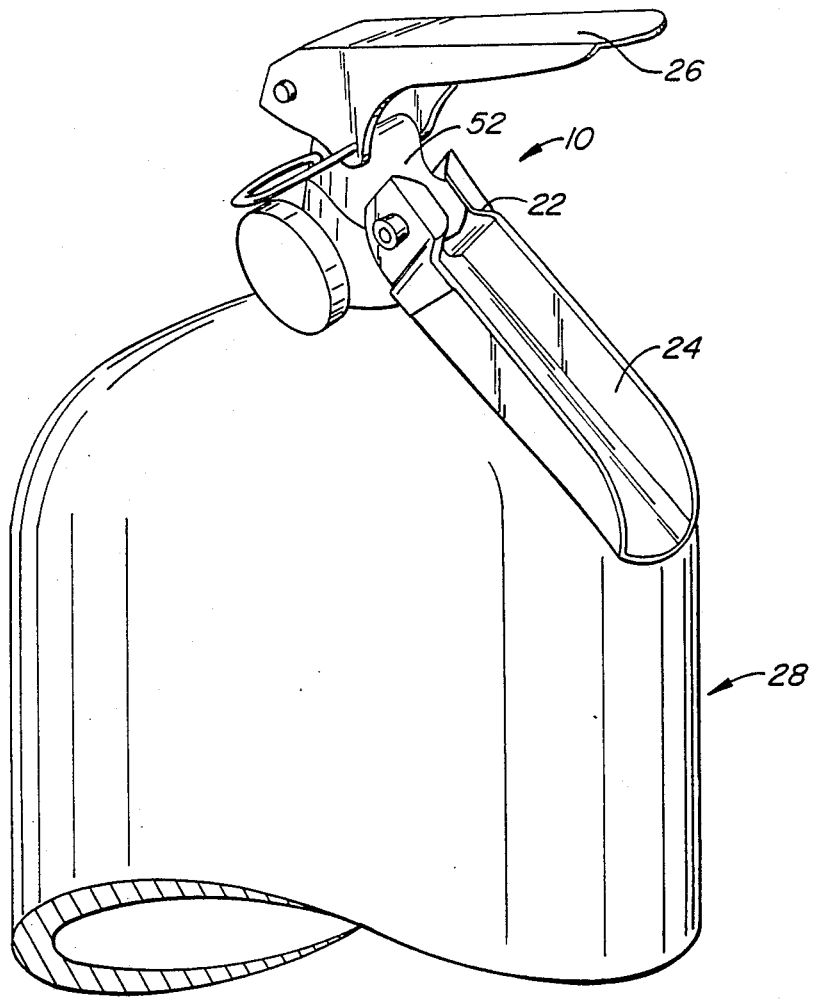
FIG.—1.
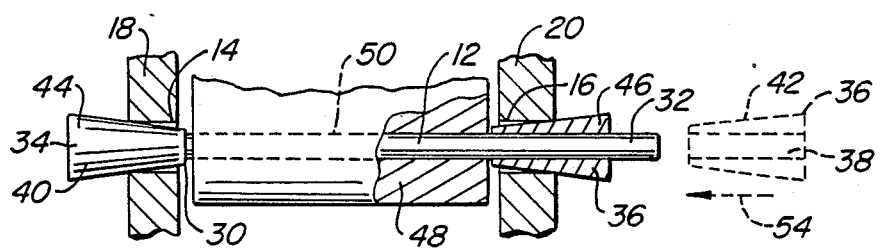
FIG.—2.

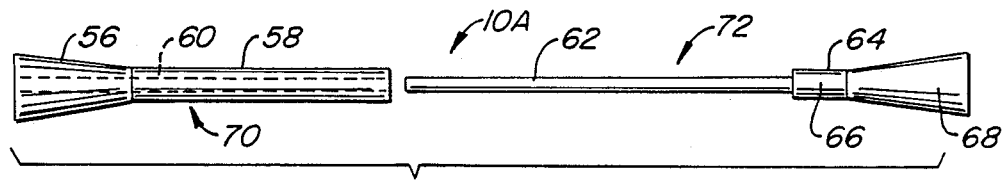
FIG._3A.
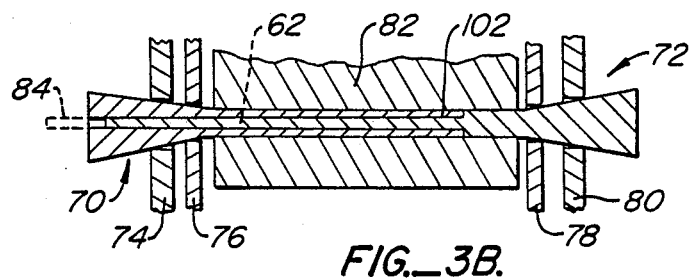
FIG._3B.
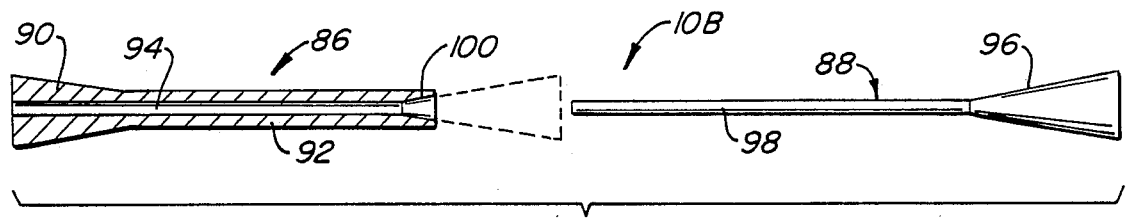
FIG._4.

RIVET PIN

This is a continuation of application Ser. No. 887,359 filed 21 July 1986 and now abandoned.

BACKGROUND OF THE INVENTION

The present invention relates to a novel rivet for holding two members together.

In the past, rivets have been employed having an end portion which is spreadable by a specialized tool. Such rivets may be used for holding two bodies together. It has been found that the proper sized rivet must be used such that the two bodies are held together properly. Consequently, the user of the rivet is required to transport and have available a variety of rivets of different sizes. This inventory requirement is expensive and inconvenient.

A rivet with universal sizing characteristics would be a great advance in the art of fasteners.

SUMMARY OF THE INVENTION

In accordance with the present invention a novel and useful rivet for holding together first and second members as provided.

The rivet of the present invention utilizes first and second members having openings through the same. A shaft is employed having first and second end portions for occupying at least a part of each of the openings through the first and second members.

The rivet is fastened to the first and second members by providing a cap having an internal bore through the same. The first and second end portions of the shaft are capable of extending into the bore of the cap to cause frictional engagement between the cap and the first end portion of the shaft. The cap also has an enlargement with an exterior surface for frictionally engaging the opening through the first member. The exterior surface of the cap may be tapered for frictional engagement with the sides of the openings through the first member.

The cross-sectional sides of the internal bore of the cap may be constructed such that it is smaller than the cross-sectional size of the shaft. Where a soft metal, such as brass, is used for the cap and shaft, the cap and shaft may be force fitted.

The shaft may also include a second cap which serves as an obstruction on the shaft second end portion. Such an obstruction is capable of frictionally engaging the second member. Again, the second cap may have an internal bore which possesses a cross-sectional size smaller than the cross-sectional size of the second shaft. Likewise, the external surface of the second cap may be tapered to form an enlargement which frictionally engages the sides of the openings of the second member.

It may be apparent that a novel and useful rivet possessing a universal sizing characteristic has been described.

It is another object of the present invention to provide a rivet for holding together a pair of members which utilizes removable caps which engage a shaft such that the caps have a tapered exterior surface for engaging openings through the first and second members of varying sizes.

Another object of the present invention is to provide a rivet for holding together first and second members which is adjustable according to the distance between the first and second members and adjustable according to the openings through the first and second members.

It is another object of the present invention to provide a rivet for holding together first and second members which may be used as a pivot pin for a body placed between the first and second members.

The invention possesses other objects and advantages especially as concerns particular characteristics and features thereof which will become apparent as the specification continues.

BRIEF DESCRIPTION OF THE DRAWINGS

FIG. 1 is a broken top right perspective view of the rivet of the present invention in place of a fire extinguisher.

FIG. 2 is a broken sectional view of the rivet of the present invention showing a removable cap in phantom.

FIG. 3A is a side elevational partially exploded view of another element of the present invention.

FIG. 3B is a sectional view of the embodiment shown in FIG. 3A in its assembled state.

FIG. 4 is an exploded view of yet another embodiment of the present invention having a portion in section.

For a better understanding of the invention reference is made to the following detailed description of the preferred embodiments thereof which should be referenced to the hereinabove described drawings.

DESCRIPTION OF THE PREFERRED EMBODIMENTS

Various aspects of the present invention will evolve from the following detailed description of the preferred embodiments thereof which should be referenced to the prior described drawings.

The invention as a whole is shown in the drawings by reference character 10. The rivet 10 includes as one of its element a shaft 12 which is capable of extending through openings 14 and 16 of first member 18 and second member 20, respectively, FIG. 2. With reference to FIG. 1, it may be seen that first and second members 18 and 20 take the form of opposite sides of split end portion 22 of grip 24. End portion 22 pivots upwardly when grip 26 is squeezed forward grip 24. Grips 24 and 26 are portion a of fire extinguisher 28 with which device 10 may be employed. However device 10 may be employed in other environments; wherever two bodies are to be linked by a rivet.

Shaft 12 includes a first end portion 30 and a second end portion 32. A first cap 34 and a second cap 36 are used in conjunction with shaft 12.

With reference to FIG. 2, second cap 36 is shown in section and in phantom. It should be understood that first cap 34 possesses the same structure as second cap 36. Therefore, the discussion hereinafter with regard to the second cap 36 also applies to first cap 34. Second cap 36 includes an internal bore 38 which is about the same size as the diameter of shaft 12. In certain cases, bore 38 is sized very slightly smaller than the diameter of shaft 12 such that press fitting of caps 34 and 36 is possible.

The exterior surfaces 40 and 42 of caps 34 and 36 are tapered such that ends 44 and 46 of caps 34 and 36 serve as enlargements. Shaft 12 and caps 34 and 36 may be formed of soft metal such as brass, copper and the like to aid in the force fitting process.

With reference to FIG. 3A it may be seen that a rivet 10A is depicted representing another embodiment of the present invention. Rivet 10A includes a truncated conical section 56 which is integrally formed or affixed to cylindrical section 58. A bore 60 passes through truncated section 56 and cylindrical section 58 to accommodate shaft 62 attached to end member 64. End member 64 again consists of a cylindrical section 66 and a truncated conical section 68. Again, bore 60 would be sized very slightly smaller than the diameter of shaft 62 such that shaft 62 may be press fitted within bore 60. With reference to FIG. 3B it may be seen that female member 70 has been press fitted to male member 72 of embodiment 10A of the present invention. Rivet 10A may be employed to hold bodies 74, 76, 78, and 80 to body 82. End portion 84 of shaft 62 may be broken off or cut from shaft 62 after the above discussed press fitting has taken place.

FIG. 4 describes yet another embodiment 10B of the present invention in which a female member 86 and a male member 88 are shown. Female member includes a conical end portion 90 integrally formed with a cylindrical portion 92 having a bore 94 therethrough. Male member 98 includes a conical portion 96 and a shaft 98 which is press fitted into bore 94 female member 86. A conical shape cavity 100 would be sized to press fit a portion of conical section 96 of male member 88.

In operation, shaft 12 of rivet 10 is extended through openings openings 14 and 16 through first and second members 18 and 20 respectively. A body 48 may also include an opening 50 for permitting shaft 12 to pass therethrough. With reference to FIG. 1 it may be seen that boss 52 may serve as body 48. Caps 34 and 36 are then placed on first and second end portions 30 and 32 of shaft 12 and move toward body 48 and through openings 14 and 16 of first and second members 18 and 20. The tapered exterior surfaces 40 and 42 of caps 34 and 36 engage openings 14 and 16, thus fixing caps 34 and 36 in place. Shaft 12 is also fixed within caps 34 and 36 by forcing caps 34 and 36 into shaft 12. Directional arrow 54 depicts the movement of cap 36 onto shaft 12. Any excess length of shaft 12 such as end portion 32 may be snapped off or otherwise cut from shaft 12. Rivet pin serves as a pivot 10 between fixed body 48 and first and second members 18 and 20, in the example depicted in the drawings.

With reference to the embodiment 10A, shaft 62 is press fitted into bore 60 of female member 70. Conical sections 66 and 68 of female and male members 70 and 72 would frictionally engage bodies 74, 76, 78, and 80. A bore 102 through 82 would permit cylindrical portion 58 of female member 72 to rotate freely, if desired.

With reference to embodiment 10B of the present invention, shaft 98 would be press fitted into bore 92 of female member 86. Conical section 96 would also frictionally fit within cavity 100 to hold male member 88 to female member 86.

While in the foregoing embodiments of the present invention have been set forth in considerable detail for the purpose of making complete disclosure of the invention, it may be apparent to those of skill in the art that numerous changes may be made in such detail without departing from the spirit and principles of the invention.

What is claimed is:

1. A rivet for linking first and second members supported in spaced relationship with one another, said first and second members including openings therethrough of substantially cylindrical configuration, comprising:
   a. a substantially rigid shaft, said shaft having first and second end portions for occupying at least a part of each the openings through the first and second members;
   b. a first cap having an internal bore therethrough, said first end portion of said shaft being capable of extending into said bore of said first cap causing firctional engagement between said first cap and said first end portion of said shaft, said first cap having a tapered exterior surface for frictionally engaging the opening through the first member, said internal bore of first cap extending therethrough without connection to said tapered exterior surface of said first cap; said first cap further including a hollow member attached thereto and having a bore therethrough of substantially cylindrical configuration, said shaft frictionally engaging said bore of said hollow member, said hollow member including an external surface forming a portion between the first and second members, said hollow member including an enlargement of said substantially cylindrical bore therethrough, said enlargement having a wall frictionally engaging said second cap;
   c. a second cap having an internal bore therethrough, said second end portion of said shaft being capable of extending into said bore of said second cap causing frictional engagement between said second cap and said second end portion of said shaft, said second cap having a tapered exterior surface for frictionally engaging the opening through the second member, said internal bore of said second cap extending therethrough without connection to said tapered exterior surface of said first cap, said frictional engagement of said first and second caps with the first and second members and said frictional engagement of said bores of said first and second caps being of sufficient magnitude to fix said shaft between the first and second members, said first and second caps being constructed of relatively hard, rigid, material.

2. The rivet of claim 1 in which the cross-sectional size of said internal bores of said first and second caps is less than the cross-sectional size of said shaft.

3. The rivet of claim 1 in which said first cap further includes a hollow member attached thereto and having a bore therethrough of substantially cylindrical configuration, said shaft frictionally engaging said bore of said hollow member, said hollow member including an external surface forming a portion between the first and second members.

4. The rivet of claim 3 in which said hollow member includes an enlargement of said substantially cylindrical bore therethrough, said enlargment having a wall frictionally engaging said second cap.

* * * * *